United States Patent [19]

Garbarini et al.

[11] Patent Number: 4,463,871

[45] Date of Patent: Aug. 7, 1984

[54] CLOSURE SEAL FOR HIGH PRESSURE VESSEL

[75] Inventors: Philip P. Garbarini, Jersey City; Renato R. Noe, Union City, both of N.J.

[73] Assignee: Public Service Electric and Gas Company, Newark, N.J.

[21] Appl. No.: 519,857

[22] Filed: Aug. 3, 1983

[51] Int. Cl.³ .............................................. B65D 53/00
[52] U.S. Cl. ...................................... 220/378; 220/3; 220/327
[58] Field of Search .................. 220/3, 378, 327, 328; 277/12, 112, 117, 119; 292/256.71

[56] References Cited

U.S. PATENT DOCUMENTS

| | | |
|---|---|---|
| 2,009,877 | 7/1935 | Dodd ........................................ 220/3 |
| 2,273,186 | 2/1942 | Fischer ..................................... 220/3 |
| 2,342,186 | 2/1944 | Fischer . | |
| 2,956,704 | 10/1960 | Boni, Jr. . | |
| 2,959,322 | 11/1960 | West . | |
| 3,459,325 | 8/1969 | Knoedler . | |
| 3,693,822 | 9/1972 | Thillet ...................................... 220/3 |
| 3,698,591 | 10/1972 | Morin . | |
| 3,915,337 | 10/1975 | Parsels ..................................... 220/327 |
| 4,108,327 | 8/1978 | Shonerd et al. ........................ 220/378 |
| 4,240,561 | 12/1980 | Hagstrom et al. ..................... 220/378 |

*Primary Examiner*—George T. Hall
*Attorney, Agent, or Firm*—Kenyon & Kenyon

[57] ABSTRACT

Sealing between an access opening in a pressure vessel and a closure member fitted in the opening is provided by an O-ring of perfluoroelastomer in an annular groove formed in a surface of the closure member. The sidewall of the groove on the low pressure side of the seal has a concave curvature in cross section so as to form a "hook" or lip which retains the O-ring in the groove and prevents creeping extrusion of the O-ring under prolonged exposure to high temperature and pressure fluid on the high pressure side of the seal, even with a clearance between the closure member and the access opening of up to approximately 1 percent of the diameter of the O-ring cross section.

18 Claims, 8 Drawing Figures

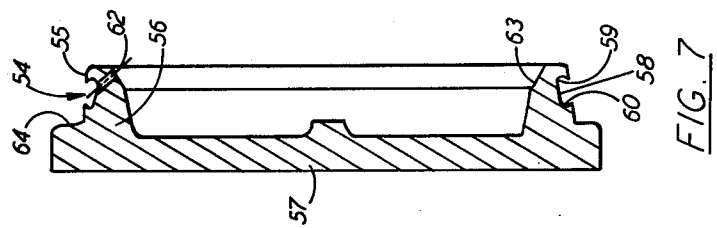
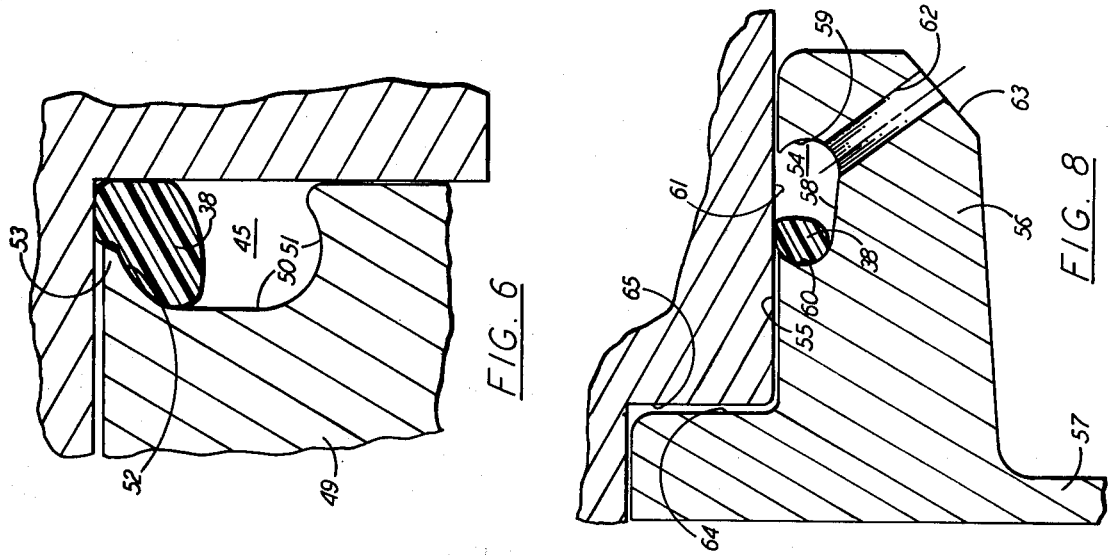
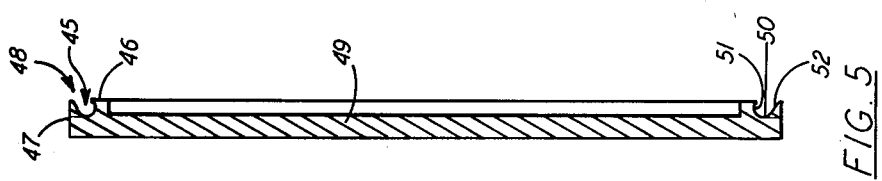
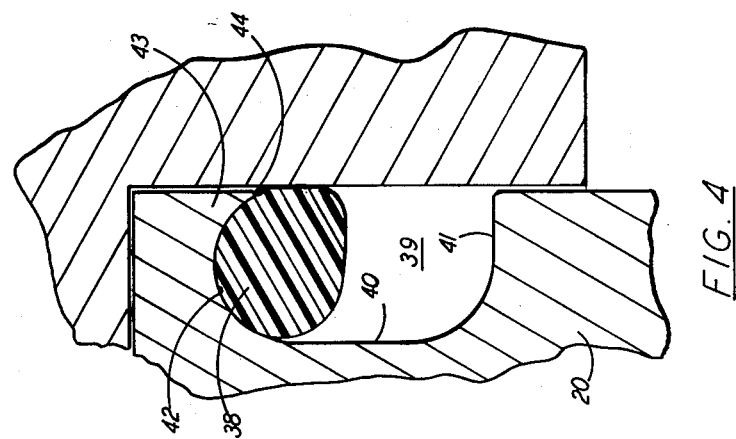
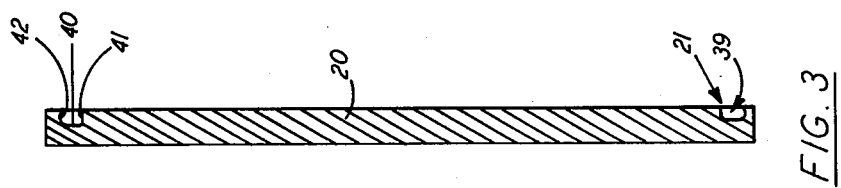

CLOSURE SEAL FOR HIGH PRESSURE VESSEL

BACKGROUND OF THE INVENTION

1. Field of the Invention

The present invention relates to closures for pressure vessels and, more particularly, to means for sealing closure members to access openings of high temperature, high pressure heat exchangers.

2. Description of the Prior Art

Utility power plants have numerous pressure vessels, such as feedwater heaters, which are designed for internal pressures as high as 5,000 psi, or even more, and at corresponding internal temperatures well above 400° F. (or 200° C.). A typical feedwater heater has a bundle of tubes arranged in a cylindrical shell, the ends of the tubes penetrating a tube sheet near one or both ends of the shell to open into a header space. Since access to the header space is necessary for periodic inspections and for replacement or repair of leaky tubes, the end of the header is usually closed by a removable cover assembly. The assembly may include a relatively thin plate or diaphragm backed by a thick cover. The diaphragm serves as a closure member or sealing member, and the cover supports the diaphragm against the internal operating pressure in the header space.

The conflicting needs to provide effective sealing over periods of many months and yet to obtain ready access for inspection and maintenance have never been satisfactorily resolved. In some units flat gaskets are clamped between the rim of the diaphragm and an annular shoulder formed in the access opening. This arrangement requires a circle of closely-spaced heavy bolts to apply pressure to the gaskets against the opposing internal pressure in the header space. Even so, leaks often develop in a short time, particularly when the heat exchanger is subjected to frequent cycles of operation.

Because of the difficulty in maintaining fluid-tight sealing with gaskets, it has become common practice to weld the diaphragm into the access opening. Welding is a time-consuming and expensive procedure, and the welds must be carefully inspected. When the sealing member must be removed for inspection or repair of the tubes, the weld must be chipped and ground out, and the mating surface must be, in many instances, filled with weld metal and remachined. This time consuming procedure may lead to postponement of regular inspections, with possibly serious consequences. In addition, after a number of operating cycles, weld seals may crack as the result of repeated thermal expansions and contractions.

SUMMARY OF THE INVENTION

The present invention addresses these shortcomings by divorcing the structural from the sealing requirements. A full access high pressure closure is provided where the vessel hydrostatic end force is dealt with in a conventional manner by breech blocks or alternatively with novel wedge locks, but the sealing function is taken over by a self energizing floating seal diaphragm, the seal being actuated by the liquid pressure. The sealing is not dependent on compressive forces imparted by the closure lock, block, or bolting.

It is the principal object of the present invention to provide a seal arrangement between an access opening and a tight sealing for the duration of the period between regular inspections and also permit rapid, nondestructive removal of the closure member.

A more specific object of the invention is to provide an O-ring type of seal for an access opening in a high pressure vessel in which the O-ring will not extrude from its groove under prolonged operation at high pressures and temperatures.

The invention is incorporated in a sealing apparatus for a pressure vessel that includes a hollow body member having an access opening including an inner portion, an outer portion, and an annular shoulder between the inner portion and the outer portion, the diameter of the outer portion being larger than the diameter of the inner portion, a sealing member having a peripheral region that includes a circumferential outer surface of the sealing member in abutment with the annular shoulder of the access opening, and means for sealing between the sealing member and the access opening, wherein said sealing means comprises:

an annular groove formed in the peripheral region of the sealing member, the groove having a base surface, an inner sidewall on the high pressure side of the groove, and an outer sidewall on the low pressure side of the groove, at least the outer sidewall having a concave curvature in cross section; and an O-ring of perfluoroelastomeric material disposed in the groove, the diameter of the cross section of the O-ring being greater than the depth of the groove adjacent to the outer sidewall, such that the O-ring is in sealing contact with the inner surface of the body member opposite the groove when the sealing member is fitted within the access opening in abutment with said annular shoulder.

The O-ring groove may be formed in the annular surface of the sealing member, in the outer circumferential surface of the sealing member, or at the intersection of the annular surface with the outer circumferential surface. In each location, the outer sidewall of the groove is concavely curved in cross section to provide an overhanging lip, or a "hook" in cross section, at the low pressure side of the groove. This lip or hook retains the O-ring in the groove against fluid pressure acting from the high pressure side of the groove.

If the groove is formed in the outer circumferential surface of the sealing member or closure member, the depth of the groove may increase from the outer sidewall to the inner sidewall, and the latter may also have a concave curvature in cross section.

The above and other objects, features, and advantages of the present invention will be described in more detail in connection with the drawings of preferred embodiments.

BRIEF DESCRIPTION OF THE DRAWINGS

FIG. 3 is a side view in cross section of a sealing member having an O-ring groove.

FIG. 4 is a partial detail, on an enlarged scale, of a seal arrangement incorporating the sealing member of FIG. 3.

FIG. 5 is a side view in cross section of an alternative embodiment of a sealing member having an O-ring groove.

FIG. 6 is a partial detail, on an enlarged scale, of a seal arrangement incorporating the sealing member of FIG. 5.

FIG. 7 is a side view in cross section of another alternative embodiment of a sealing member having an O-ring groove.

FIG. 8 is a partial detail, on an enlarged scale, of a seal arrangement incorporating the sealing member of FIG. 7.

DETAILED DESCRIPTION OF THE PREFERRED EMBODIMENTS

The seal arrangement of the present invention will be described with particular reference to one type of closure assembly for a high pressure heat exchanger, but it will be understood that this is for illustrative purposes, only. The seal arrangement as shown and described is adaptable to numerous other high pressure sealing applications.

Figure 2:
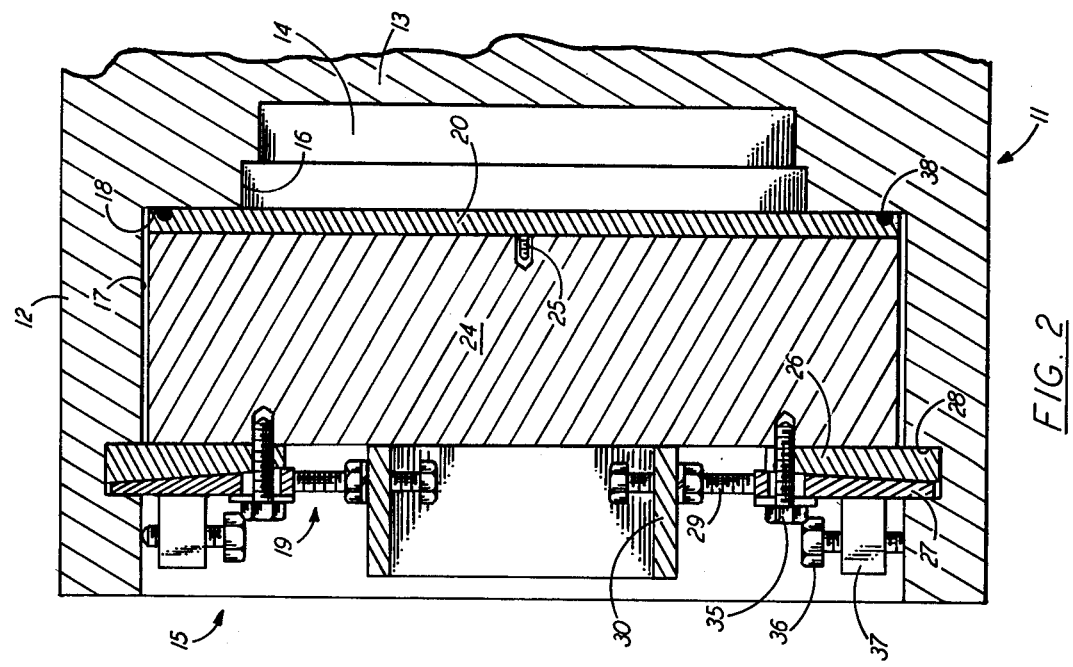
FIG. 2 is a partial side view in cross section of the pressure vessel and closure assembly of FIG. 1, showing the location of a sealing means according to the invention.
Figure 1:
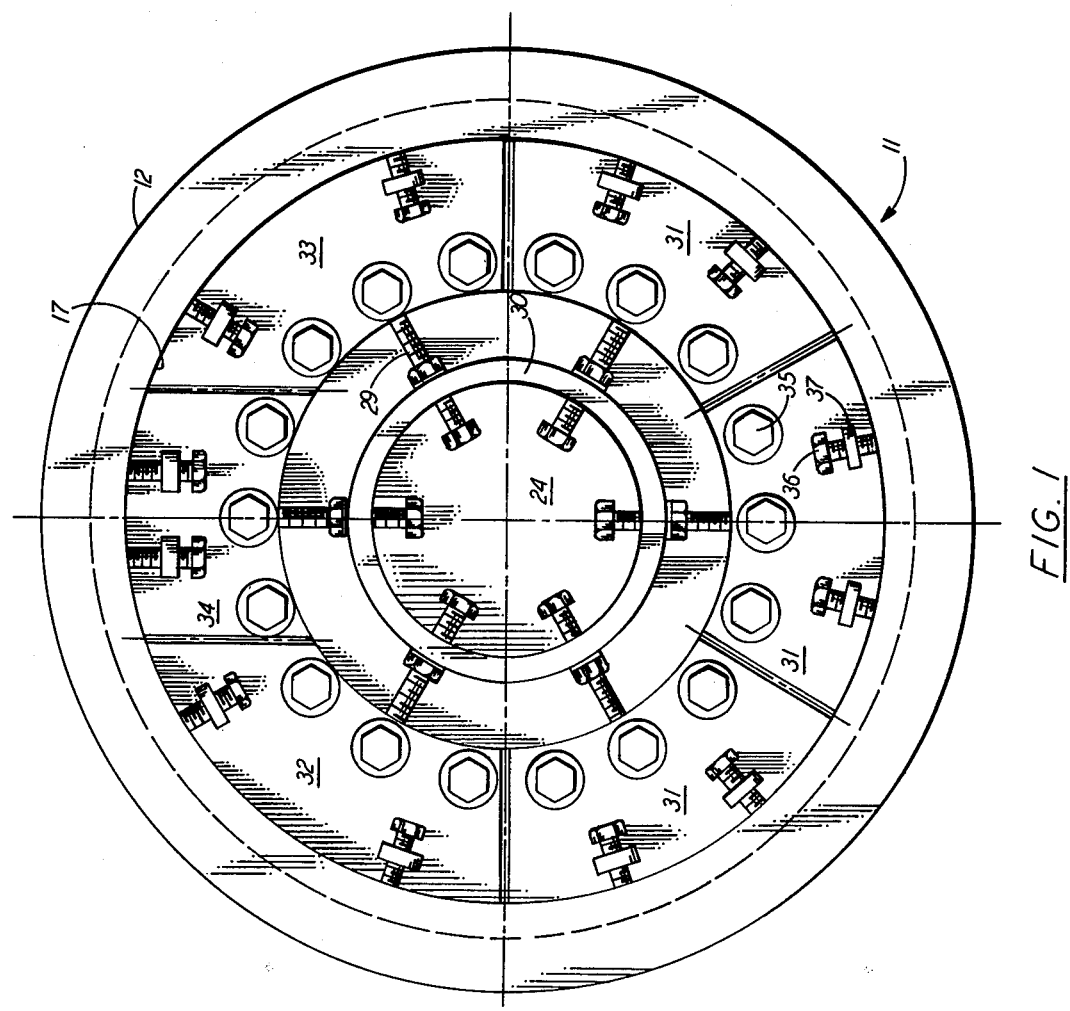
FIG. 1 is an end view of a closure assembly for an access opening of a pressure vessel.

With reference to FIGS. 1 and 2, a pressure vessel 11, such as a conventional feedwater heater, includes a cylindrical hollow body member or channel 12 having an integral tube sheet 13. A bundle of tubes (not shown) penetrate the tube sheet and open into a header space 14. Only one end of the heat exchanger is shown, because the invention is concerned only with sealing an access opening 15 provided in the end of the channel to the header space for inspecting and repairing or replacing the tubes, as necessary. It will be understod, however, that the tubes of the bundle either extend to penetrate a similar tube sheet at the other end of the shell, or they bent into U-shape and return to the first tube sheet. In the latter case, the header space must be subdivided into separate supply and return regions.

Boiler feedwater under high pressure flows through the tubes from or to the header space. Corresponding inlet or outlet connections to the header space are not shown, to avoid unnecessarily complicating the drawing, and the same is true for steam connections to and from the shell side of the heater, all of which are conventional and well known.

As shown in FIG. 2, the access opening 15 has an inner portion 16, an outer portion 17 larger in diameter than the inner portion, and an annular shoulder 18 between the inner and outer portions. A closure assembly 19 for the access opening includes a sealing member in the form of a thin plate or diaphragm 20.

After the diaphragm is located in place, a thick cover plate 24 is inserted into the access opening and positioned on a centering stud 25 extending from the diaphragm. The cover plate serves as a backing member for the thin diaphragm. The force exerted on the cover plate by the internal pressure directed onto the diaphragm is transferred to the channel of the heater by a bottom shear ring 26 and a top shear ring 27 (see FIG. 2). Bottom shear ring 26 is composed of sector pieces, each having a cross-sectional wedge shape that expands radially outward. Top shear ring 27 is composed of sector pieces each having a complementary cross-sectional wedge shape that extends in the radially inward direction.

The shear rings are assembled by first inserting the sector pieces of the bottom shear ring into a circumferential groove 28 formed in the outer portion of the access opening. After the bottom ring sector pieces have been inserted all the way to the base of groove 28, the sector pieces of the top shear ring are inserted into the groove and are urged radially outward by lock bolts 29 that are threaded through a lock base ring 30 welded to the cover plate. As shown in FIG. 1, the top sector pieces (and also the bottom sector pieces) have four different shapes, indicated by reference numerals 31, 32, 33, and 34. As apparent from the drawing, the different shapes are necessary to be able to fit the sector pieces into groove 28. The three pieces 31 are inserted first, then the two pieces 32 and 33, and finally piece 34. The wedging action between the bottom and top set of sector pieces moves the cover plate into tight abutment against the diaphragm, as can be seen by inspection of FIG. 2. After the sector pieces have been wedged tightly, the bottom and top shear rings are clamped together by shear ring bolts 35.

To dismantle the closure assembly, the procedure is essentially reversed. Shear ring bolts 35 are loosened, lock bolts 29 are backed off, and the sector pieces of the top shear ring are extracted from the groove with the aid of jack bolts 36 mounted in brackets 37 that are welded to the sector pieces of the top shear ring.

The above-described elements of the closure assembly are essentially conventional and do not form part of the present invention, which is directed to a means for providing an effective seal between the diaphragm and the body of the pressure vessel. In FIG. 2, the sealing means is indicated as an O-ring 38 placed in an annular groove 39 (FIG. 3). The discovery of the present invention is that the shape of the groove has a critical effect on the ability of the seal to withstand extrusion of the O-ring under typical operating conditions of high pressure feedwater heaters in a utility power plant.

With reference to FIGS. 3 and 4, the O-ring groove 39 is defined by a base surface 40 joining an inner sidewall 41 and an outer sidewall 42. The inner sidewall is disposed on the high pressure side of the groove, that is, the side closest to the interior of the pressure vessel. The outer sidewall is disposed on the low pressure side of the groove, that is, the side closest to the exterior of the vessel. Normally, the low pressure side of the seal will be at atmospheric pressure, assuming only a single seal is used in the closure assembly.

In conventional O-ring seal design, the groove for the O-ring is rectangular in cross-section, with a flat bottom or base and straight sides. The applicants have found that an O-ring seal arrangement using this conventional design will fail within a matter of days after being put into service under high pressure (1500 to 5000 psi) in units where the diameter of the access opening may range from 30 inches (75 cm) to as much as 70 inches (180 cm).

The applicants have further discovered, however, that if the groove is formed with a concave outer sidewall, so as to create an overhanging lip 43 or "hook", the O-ring will be retained indefinitely within the groove, even at pressures up to 5000 psi. FIG. 4 shows the O-ring 38 pressed against the outer sidewall under the operating pressure of the seal. It is clear that the hook of the sidewall serves as a shield against extrusion of the O-ring.

The preferred shape of the concave outer sidewall 42 is a circular arc that is tangent to the base of the groove and also to the plane of the annular surface 21 of the diaphragm. The edge 44 of the overhanging lip 43 should not be sharp but should be rounded with a slight radius (e.g., 0.015 inch or 0.45 mm).

In addition to the hook shape of the groove, the material of the O-ring itself is important, particularly at higher temperature (i.e., above 400° F. or 200° C.). A fluoroelastomer that gives good results at temperatures below 400° F. is sold by DuPont under the trademark VITON. This material is not suitable for temperatures above 400° F. For higher temperatures, a DuPont perfluoroelastomer, sold under the trademark KALREZ has been found to give excellent results.

Another factor that is important in preventing extrusion of the O-ring, even with a hooked groove, is the clearance between the outer surface of the diaphragm adjacent to the outer sidewall and the opposing surface of the access opening. Preferably, this clearance should not exceed approximately 1 percent of the diameter of the cross section of the O-ring.

Because the force exerted on the diaphragm and cover plate by the internal pressure is extremely high (e.g., 5,000,000 lbs for a three foot diameter plate at 5000 psi), the diaphragm may move away from the annular shoulder by a distance that exceeds the clearance limit for the particular seal design, particularly in some styles of closure assembly. The circumferential or hoop strength and rigidity of such pressure vessels is often greater than the axial rigidity of the closure assembly. For this reason it may be desirable to place at least the outer sidewall of the O-ring groove so that it intersects an outer circumferential surface of the diaphragm.

With reference to FIGS. 5 and 6, an alternative arrangement is shown in which an O-ring groove 45 is placed at the intersection between an annular surface 46 and an outer circumferential surface 47 in a peripheral region 48 of a diaphragm 49. The groove has a base surface 50 joining an inner sidewall 51 and a concave outer sidewall 52. The outer sidewall is formed with an overhanging lip 53, and the curve of its arcuate cross section is tangent both to the base surface 50 and to a cylindrical envelope defined by the outer circumferential surface 47. As explained before, the edge of the lip should not be sharp. It also should not be excessively rounded, or the benefit of the hook shape will be diminished.

With reference to FIGS. 7 and 8, still another embodiment is shown, in which an O-ring groove 54 is formed completely in an outer circumferential surface 55 of a circular rib 56 extending axially from one face of a diaphragm 57. The groove has a base surface 58 extending between an inner sidewall 59 and an outer sidewall 60.

In this embodiment, both the inner and outer sidewalls are concavely curved in cross section, and the radial distance of the base surface 58 from the outer circumferential surface 55 increases from the outer sidewall to the inner sidewall, such that the depth of the groove adjacent to the inner sidewall is sufficient to prevent contact by the O-ring with the opposite surface 61 of the access opening when the O-ring is positioned against the inner sidewall. This design permits the O-ring to be installed initially against the inner sidewalls of the groove and the diaphragm then to be inserted into the access opening without scraping or otherwise damaging the O-ring. After installation and startup of the equipment, increasing internal pressure will force the O-ring against the outer sidewall and wedge it in sealing contact with the opposed surface 61 of the access opening. To assure that the O-ring moves into sealing position, it is preferable to provide at least one passage 62 leading from the groove near the inner sidewall to a surface 63 of the diaphragm that is exposed to the internal pressure of the vessel.

It will be apparent to those skilled in the art that the principles of the invention as described can be applied to other physical arrangements, and it is not intended to limit the scope of the invention to the specific embodiments shown by way of example.

We claim:

1. Sealing apparatus for a pressure vessel that includes a hollow body member adapted to contain fluid at high temperature and high pressure, said body member having an access opening including an inner portion, an outer portion, and an annular shoulder between the inner portion and the outer portion, the diameter of the outer portion being larger than the diameter of the inner portion, a sealing member having a peripheral region that includes a circumferential outer surface and an annular surface, means for holding the annular surface of the sealing member in abutment with the annular shoulder of the access opening, and means for sealing between the sealing member and the access opening, wherein said sealing means comprises an annular groove formed in the peripheral region of the sealing member, the groove having a base surface, an inner sidewall on the high pressure side of the groove, and an outer sidewall on the low pressure side of the groove, at least the outer sidewall having a concave curvature in cross section; and an O-ring of perfluorolatomeric material disposed in the groove, the diameter of the cross section of the O-ring being greater than the depth of the groove, such that the O-ring is in sealing contact with an inner surface of the body member opposite the groove when the sealing member is fitted within the access opening in abutment with said annular shoulder.

2. Sealing apparatus according to claim 1 wherein the annular groove is formed in said annular surface of the sealing member.

3. Sealing apparatus according to claim 2 wherein the curve of the outer sidewall is approximately tangent to the plane of the annular surface of the sealing member.

4. Sealing apparatus according to claim 2 wherein the curve of the outer sidewall intersects the circumferential outer surface of the sealing member.

5. Sealing apparatus according to claim 4 wherein the curve of the outer sidewall is approximately tangent to a cylindrical envelope defined by the circumferental outer surface of the sealing member.

6. Sealing apparatus according to claim 1 wherein the annular groove is formed in said circumferential outer surface of the sealing member.

7. Sealing apparatus according to claim 6 wherein the curve of the outer sidewall if approximately tangent to a cylindrical envelope defined by the circumferential outer surface of the sealing member.

8. Sealing apparatus according to claim 6 wherein the inner sidewall of the groove has a concave curvature in cross section.

9. Sealing apparatus according to claim 6 wherein the radial distance of the base of the groove from the circumferential outer surface of the sealing member increases from the outer sidewall to the inner sidewall.

10. Sealing apparatus according to claim 9 wherein the inner sidewall of the groove has a concave curvature in cross section.

11. Sealing apparatus according to claim 9 wherein at least one passage is provided between the groove in the region of the sealing member and a surface of the sealing member that is exposed to the interior of the body member.

12. Sealing apparatus according to claim 1 wherein the sealing member comprises a metal diaphragm having a circular rib extending axially from one face adjacent the edge of the diaphragm, the rib having a cylindrical outer surface, and said groove is formed in the cylindrical outer surface of the rib.

13. Sealing apparatus according to claim 12 wherein the annular surface of the sealing member is located radially outward from the cylindrical outer surface of the circular rib.

14. Apparatus for sealing between an access opening into a pressure vessel adapted to contain fluid at high temperature and high pressure and a closure member for said access opening, the access opening having an inner circumferential surface portion, the closure member having an outer circumferential surface portion fitting within the inner circumferential surface portion of the access opening, and the sealing apparatus including a peripheral groove formed in the outer circumferential surface portion of the closure member and an O-ring disposed in the groove, said groove having a radially outward facing base surface between an inner sidewall on the high pressure side of the groove and an outer sidewall on the low pressure side of the groove, wherein the improvement comprises:

at least the outer sidewall of the groove having a concave curvature in cross section, the curve of which is approximately tangent to a cylindrical envelope defined by the outer circumferential surface portion of the closure member.

15. Apparatus according to claim 14 wherein the diameter of the cross section of the O-ring is not less than approximately 100 times the clearance between the outer circumferential surface portion of the closure member and the inner circumferential surface portion of the access opening.

16. Apparatus according to claim 14 wherein the radial distance of the base surface of the groove from the outer circumferential surface portion of the closure member increases from the outer sidewall to the inner sidewall of the groove.

17. Apparatus according to claim 16 wherein the inner sidewall of the groove has a concave curvature in cross section, the curvature of the inner sidewall having a radius larger than the radius of cross-sectional curvature of the outer sidewall.

18. Apparatus according to claim 16 wherein at least one passage is provided between the groove in the region of the inner sidewall and a surface of the closure member that is exposed to the interior pressure of the pressure vessel.

* * * * *

UNITED STATES PATENT AND TRADEMARK OFFICE
CERTIFICATE OF CORRECTION

PATENT NO. : 4,463,871

DATED : 7 August 1984

INVENTOR(S) : Philip P. Garbarini and R. R. Noe

It is certified that error appears in the above—identified patent and that said Letters Patent is hereby corrected as shown below:

Column 3, line 29: change "understod" to --understood--.

Column 3, line 32: change "bent" to --bend--.

Column 6, line 27: change "perfluorolatomeric" to --perfluoroelastomeric--.

Column 6, line 52: change "if" to --is--.

Signed and Sealed this

Twenty-second Day of January 1985

[SEAL]

Attest:

DONALD J. QUIGG

Attesting Officer

Acting Commissioner of Patents and Trademarks